United States Patent [19]
Bluhm et al.

[11] Patent Number: 5,838,897
[45] Date of Patent: Nov. 17, 1998

[54] DEBUGGING A PROCESSOR USING DATA OUTPUT DURING IDLE BUS CYCLES

[75] Inventors: Mark W. Bluhm, Plano; Mark W. Hervin, Dallas, both of Tex.

[73] Assignee: Cyrix Corporation, Richardson, Tex.

[21] Appl. No.: 606,774

[22] Filed: Feb. 27, 1996

[51] Int. Cl.[6] .................................................. G06F 11/00
[52] U.S. Cl. ...................................................... 395/183.06
[58] Field of Search ...................... 395/183.06, 183.166, 395/183.13, 375; 371/22.1, 22.5

[56] References Cited

U.S. PATENT DOCUMENTS

| | | |
|---|---|---|
| 4,479,178 | 10/1984 | Schabowski ............................ 364/900 |
| 5,479,652 | 12/1995 | Dreyer et al. ....................... 395/183.06 |
| 5,544,311 | 8/1996 | Harenberg et al. ................ 395/183.16 |

Primary Examiner—Vincent P. Canney
Attorney, Agent, or Firm—Andrew S. Viger; John L. Maxin

[57] ABSTRACT

A processor for outputting processor state information during idle bus cycles to facilitate the diagnosing and debugging of a processor. The processor includes a plurality of external pins for communicating data from the processor; a visibility register for selecting one of a plurality of modes which identifies processor state information to output onto the plurality of external pins; and a bus interface unit for communicating data to the external pins of the processor and for detecting an idle bus cycle. The bus interface unit outputs processor state information according to the identified mode onto the plurality of external pins in response to detecting an idle bus cycle.

18 Claims, 8 Drawing Sheets

| 31 30 | 29 28 | 27 26 | 25 24 | 23 22 | 21 20 | 19 18 | 17 16 | 15 | 14 | 13 | 12 11 10 | 9 | 8 | 7 | 6 | 5 | 4 | 3 | 2 | 1 | 0 | |
|---|---|---|---|---|---|---|---|---|---|---|---|---|---|---|---|---|---|---|---|---|---|---|
| LEN 3 | R/W 3 | LEN 2 | R/W 2 | LEN 1 | R/W 1 | LEN 0 | R/W 0 | 0 | WP | G0 | 0 0 1 | GE | LE | G3 | L3 | G2 | L2 | G1 | L1 | G0 | L0 | DR7 |
| 0 0 | 0 0 | 0 0 | 0 0 | 0 0 | 0 0 | 0 0 | 0 0 | BT | BS | 0 | 0 1 1 | 1 | 1 | 1 | 1 | 1 | 1 | D3 | B2 | D1 | B0 | DR6 |
| BREAKPOINT 3 ADDRESS ||||||||||||||||||||||  DR3 |
| BREAKPOINT 2 ADDRESS |||||||||||||||||||||| DR2 |
| BREAKPOINT 1 ADDRESS |||||||||||||||||||||| DR1 |
| BREAKPOINT 0 ADDRESS |||||||||||||||||||||| DR0 |

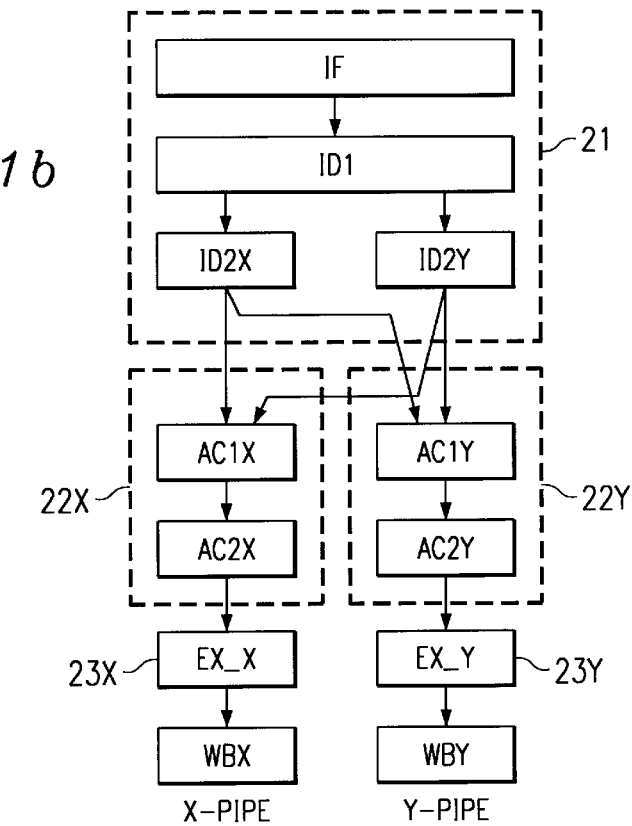

FIG. 3

| 3 3<br>1 0 | 2 2<br>9 8 | 2 2<br>7 6 | 2 2<br>5 4 | 2 2<br>3 2 | 2 2<br>1 0 | 1 1<br>9 8 | 1 1<br>7 6 | 1 1<br>5 4 | 1 1<br>3 2 | 1 1<br>1 0 | 9 8 | 7 6 | 5 4 | 3 2 | 1 0 | |
|---|---|---|---|---|---|---|---|---|---|---|---|---|---|---|---|---|
| LEN 3 | R/W 3 | LEN 2 | R/W 2 | LEN 1 | R/W 1 | LEN 0 | R/W 0 | 0 | G D | 0 0 1 | G L E E | G L 3 3 | G L 2 2 | G L 1 1 | G L 0 0 | DR7 |
| 0 | 0 | 0 | 0 | 0 | 0 | 0 | 0 | BS | BT | 0 | 0 1 1 1 1 | B D 3 | B D 2 | B D 1 | B D 0 | DR6 |
| BREAKPOINT 3 ADDRESS | | | | | | | | | | | | | | | | DR3 |
| BREAKPOINT 2 ADDRESS | | | | | | | | | | | | | | | | DR2 |
| BREAKPOINT 1 ADDRESS | | | | | | | | | | | | | | | | DR1 |
| BREAKPOINT 0 ADDRESS | | | | | | | | | | | | | | | | DR0 |

42

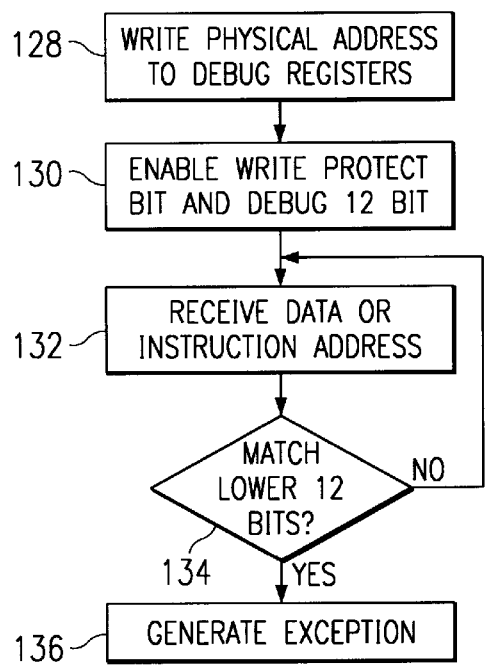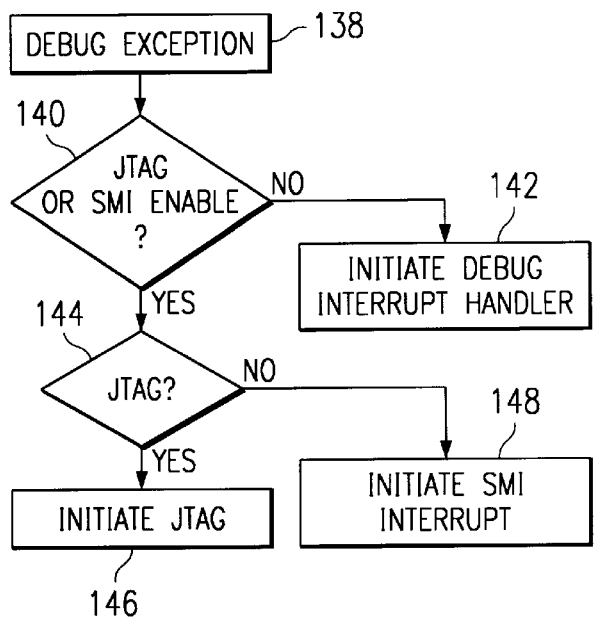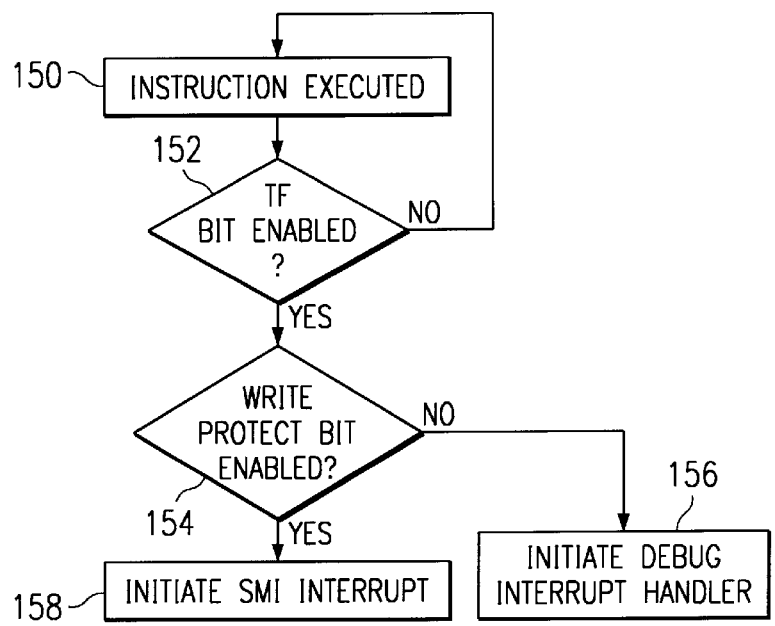

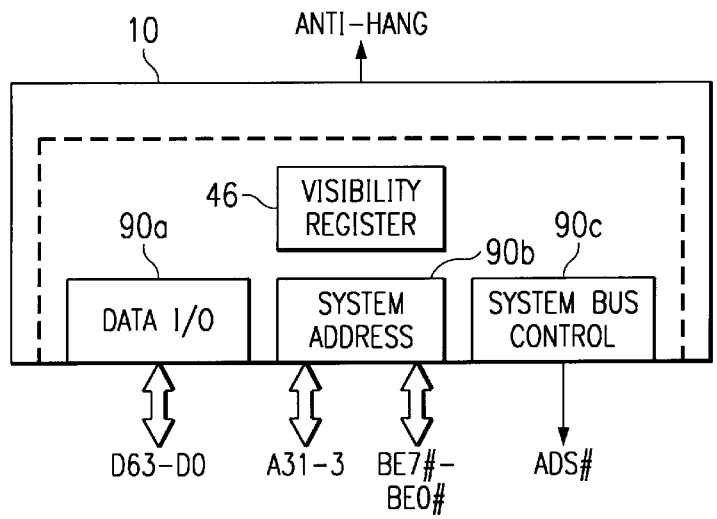
FIG. 12
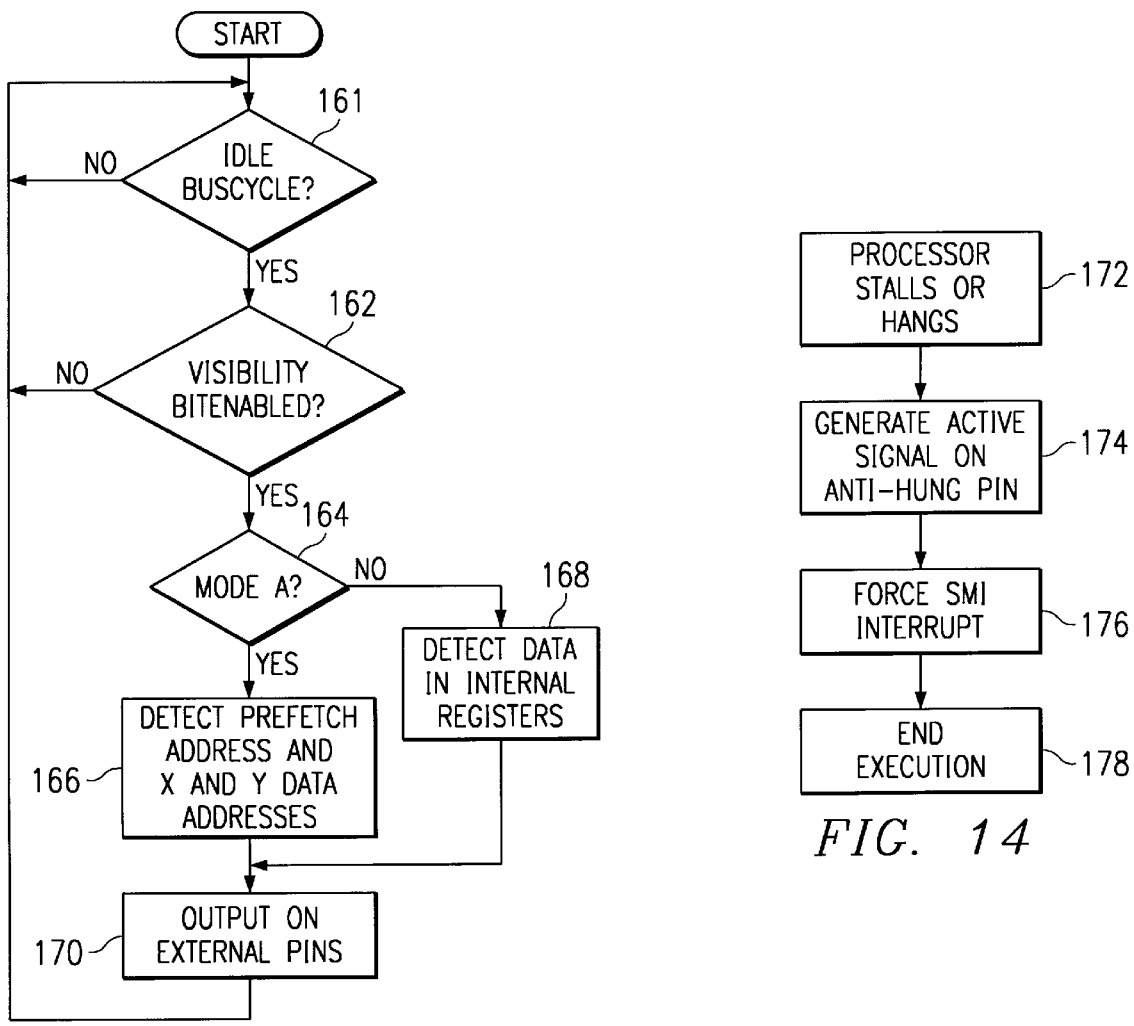
FIG. 13
FIG. 14

DEBUGGING A PROCESSOR USING DATA OUTPUT DURING IDLE BUS CYCLES

TECHNICAL FIELD OF THE INVENTION

This invention is in the field of integrated circuits, and is more particularly directed to a circuit and method for diagnosing and debugging computer hardware and software.

BACKGROUND OF THE INVENTION

The microprocessor of a computer system is the centralized location for processing a stream of instructions in a software program. The proper operation of the microprocessor during processing of instructions is vital to the operation of the system as a whole. Thus, the diagnosing and debugging of errors in a processor's execution of instructions is crucial to proper performance of the system.

During processing of instructions by a microprocessor, the instructions are fetched from memory and decoded by functional units in the microprocessor and supplied to an execution unit for execution. During execution, the execution unit of the microprocessor uses a number of general purpose registers and control registers to write/read data or store control information. The data and/or control information at any point in time stored in the microprocessor, along with other information being used by the microprocessor, such as the instruction being fetched is called the processor state.

Information about the processor state is used in diagnosing and debugging a microprocessor. In the development stage of a microprocessor, various problems may arise when executing various programs. In addition, various problems may arise when developing a new program for a platform. These various problems include output of wrong data, stall of the microprocessor or destroying data in memory. A person debugging a microprocessor identifies and isolates these various problems by accessing the processor state and analyzing the data. However, accessing the processor states during execution of a program with prior art debugging and diagnosing methods is often difficult and inflexible.

These difficulties increase when the computer system is operating in a mode that supports multitasking. The standard architecture of x386 microprocessors and beyond define three modes of memory addressing: virtual 8086 mode, protected mode, and real mode. In virtual 8086 mode, the processor can simulate a virtual 8086 processor. In real mode memory addressing, the processor uses memory addresses that combine an offset of the instruction or data with a segment base value in a specific segment register. This allows additional memory to be addressed. Real mode has the same base architecture as a 8086 but also has access to the 32 bit register set of the 80386. Protected mode allows a standard 8086 microprocessor to run several tasks concurrently, i.e. multitasking, and other features such as advanced protection facilities and virtual memory. Three mechanisms calculate a memory address in protected mode: offset mechanism, selector mechanism and paging mechanism. Privilege levels are an important part of operating in protected mode. When in protected mode, programs are not allowed to read or write data that has a higher level of privilege. Furthermore, some instructions can only be executed when the processor is operating in the mode with the highest level of privilege. The microprocessor controls the mechanics of switching between tasks. In complex multitasking systems, the conditions that cause failures can be even more complex and difficult to track.

The prior art method of diagnosing and debugging includes the use of software debug interrupt handlers. Prior art debugging handlers are usually assembly language programs executing at system level. Breakpoints are set at specific instructions or data in a program. The breakpoints halt the program and shift the program's operation to the debug interrupt handlers. Prior art debug interrupt handlers however can not access the entire processor state and, the method of setting breakpoints is not very versatile.

A need has thus arisen for a superior way to diagnose and debug errors in the execution of a stream of instructions by a microprocessor.

It is thus an object of the present invention to provide an improved method and apparatus for diagnosing and debugging errors in the execution of a stream of instructions by a microprocessor.

It is a further object of the present invention to provide a more versatile method and apparatus for creating breakpoints in a software program.

It is still a further object of the present invention to provide a superior method and apparatus for diagnosing and debugging a microprocessor with minimum increased hardware and complexity.

Other objects and advantages of the present invention will be apparent to those of ordinary skill in the art having reference to the following specification.

SUMMARY OF THE INVENTION

The present invention is a processor for outputting processor state information during idle bus cycles to facilitate the diagnosing and debugging of a processor. The processor of the present invention comprises a plurality of external pins for communicating data from the processor; a visibility register for selecting one of a plurality of modes which identifies processor state information to output onto the plurality of external pins; and a bus interface unit for communicating data to the plurality of external pins of the processor and for detecting an idle bus cycle. The bus interface unit outputs processor state information according to the identified mode onto the plurality of external pins in response to detecting an idle bus cycle. A logical analyzer or other debugging hardware may then detect the processor state information on the pins.

The plurality of modes in which the processor may output processor state information includes either a first mode which identifies prefetch instruction data and address data or a second mode which identifies data contained in internal registers. The present invention thus provides for far greater access to the processor state information without interfering with the normal execution of instructions.

BRIEF DESCRIPTION OF THE DRAWINGS

For a more complete understanding of the present invention and the advantages thereof, reference is now made to the following descriptions taken in conjunction with the accompanying drawings.

FIGS. 1a and 1b illustrate, in block diagram form, a microprocessor in which the present invention may be incorporated.

FIG. 3 illustrates, in block diagram form, debug registers used in the present invention.

FIG. 4 illustrates, in block diagram form, debug configuration registers used in the present invention.

FIG. 7 is a flow chart illustrating the operation of the present invention of matching on lower 12 bits of the debug registers.

FIG. 8 is a flow chart illustrating the method of the present invention of transferring control to a JTAG or SMI routine after a debug exception.

FIG. 9 is a flow chart illustrating the operation of the present invention of a single-step execution mode with initiation of an SMI interrupt.

FIG. 12 illustrates the bus interface unit and external pins of the processor of the present invention in more detail.

FIG. 13 is a flow chart illustrating a method of the present invention of outputting information during idle bus cycles.

FIG. 14 is a flow chart illustrating a method of operation of an Anti-Hang pin of the present invention.

DETAILED DESCRIPTION OF THE PREFERRED EMBODIMENT

A wide variety of single chip microprocessors are commercially available today. Many of these are part of the x86 family of processors termed the 8086, 80286, etc., including the Cyrix 6x86™ microprocessor from Cyrix Corporation. The invention described herein is particularly directed to the Cyrix 6x86™ microprocessor. A person of skill in the art however will appreciate that this invention is applicable to any number of microprocessors of other architectures or other integrated circuits requiring debugging and diagnosing.

Figure 1A:
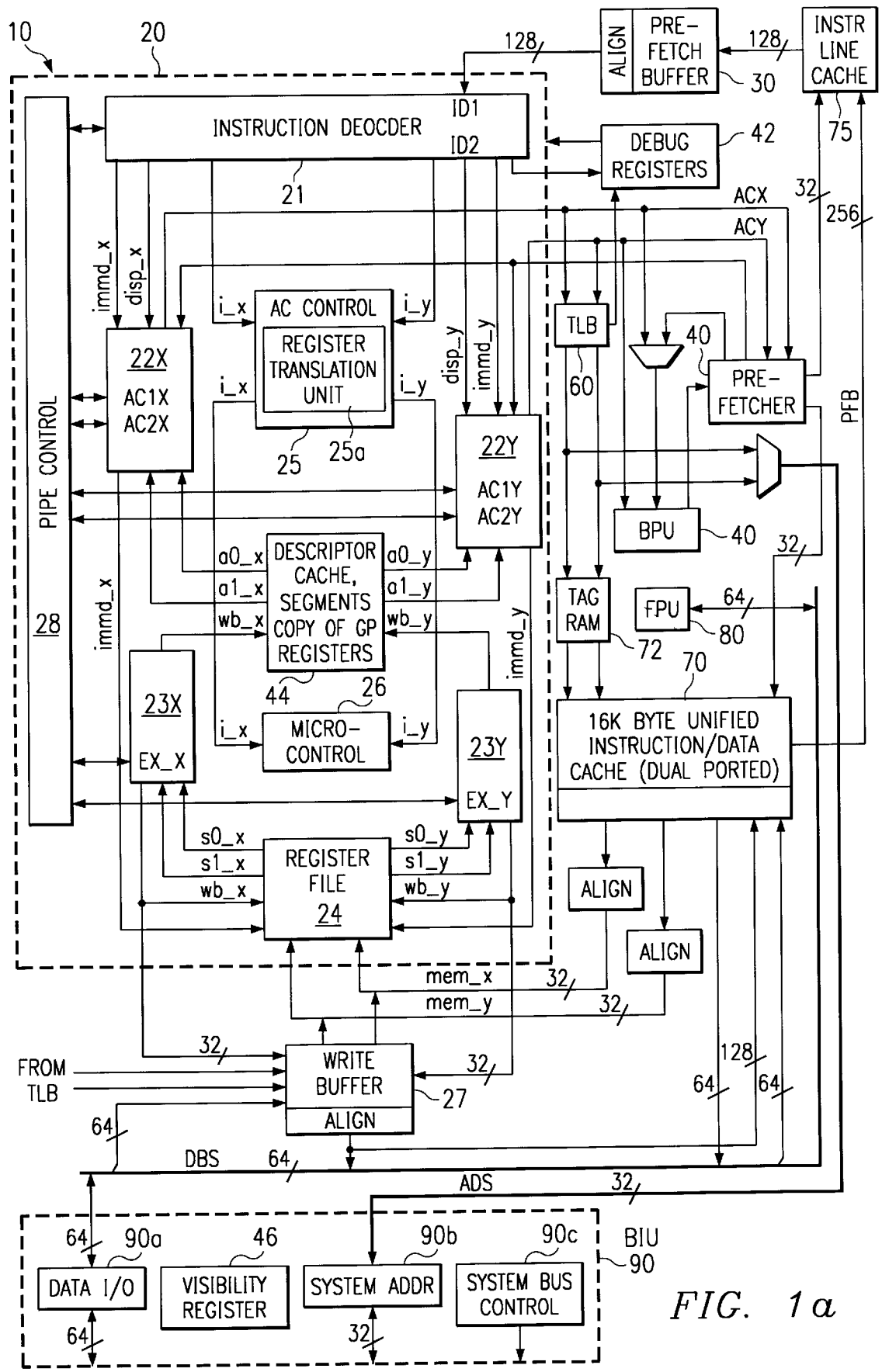

FIGS. 1a and 1b illustrate an exemplary super-pipelined microprocessor 10, into which the preferred embodiment of the invention may be implemented.

As shown in FIG. 1a, the major sub-blocks of a microprocessor 10 include: (a) an execution core 20, (b) a prefetch buffer 30, (c) a prefetcher 40, (d) branch processing unit (BPU) 50, (e) translation lookaside buffer (TLB) 60, and (f) unified 16 Kbyte instruction/data cache 70, including TAG RAM 72. A 256 byte instruction line cache 75 provides a primary instruction cache to reduce instruction fetches to the unified cache, which operates as a secondary instruction cache. An onboard floating point unit (FPU) 80 executes floating point instructions issued to it by the execution core 20.

The microprocessor 10 uses internal 32-bit address and 64-bit data buses ADS and DBS. Interface to external 32 bit address and 64 bit data buses is through a bus interface unit (BIU) 90. The BIU 90 includes three interface units: a DATA Input/Output 90a, a System Address Unit 90b and a System Bus Control Unit 90c. A 256 bit (32 byte) prefetch bus (PFB), corresponding to the 32 byte line size of the unified instruction/data cache 70 and the instruction line cache 75, allows a full line of 32 instruction bytes to be transferred to the instruction line cache 75 in a single clock.

The unified instruction/data cache 70 is 4-way associative (with a 4 k set size) cache, using a pseudo-LRU replacement algorithm, with write-through and write-back modes. It is dual ported (through banking) to permit two memory accesses (data read, instruction fetch, or data write) per clock. The instruction line cache 75 is a fully associative, lookaside implementation (relative to the unified cache), using an LRU replacement algorithm.

The execution core 20 is a superscalar design with two execution pipes X and Y. It includes an instruction decoder 21, address calculation units 22X and 22Y, execution units 23X and 23Y, and a register file 24 including thirty-two 32 bit registers. AC control unit 25 includes a register translation unit 25a. A microcontrol unit 26, including a microsequencer and microROM, provides execution control. AC control unit 25 along with microcontrol unit 26 controls the transfer of data from register file 24 to the execution units 23X and 23Y.

Writes to the unified instruction/data cache 70 from the execution core 20 are queued into twelve 32 bit write buffers 27. AC control unit 25 provides buffer allocation. These write buffers 27 provide an interface for writes to the unified cache—non-cacheable writes go directly form the write buffers 27 to external memory. The write buffer logic supports optional read sourcing and write gathering.

A pipe control unit 28 controls instruction flow through the execution pipes, including keeping the instructions in order until it is determined that an instruction will not cause an exception, squashing bubbles in the instruction stream, and flushing the execution pipes behind branches that are mispredicted and instructions that cause an exception. For each stage, the pipe control unit 28 keeps track of which execution pipe contains the earliest instruction, provides a stall output, and receives a delay input.

A set of debug registers 42 identifies breakpoints in data or instruction addresses during diagnosing and debugging of processor 10. The debug registers are connected to TLB 60 and instruction decoder 21. Though the debug registers shown in FIG. 1a are located outside of the execution core 10, a person of skill in the art will appreciate that the debug registers may be located anywhere within processor 10. The construction and operation of the debug registers in conjunction with the present invention is described in more detail hereinbelow.

Referring to FIG. 1b, the microprocessor has seven-stage X and Y execution pipelines: instruction fetch IF, two instruction decode stages ID1 and ID2, two address calculation stages AC1 and AC2, execution unit EX 23, and write-back WB. Note that the complex instruction decode ID and address calculation AC pipe stages are super pipelined.

The IF stage provides a continuous code stream into the CPU core 20. The prefetcher 40 fetches 16 bytes of instruction data into the prefetch buffer 30 from either the (primary) instruction line cache 75 or the (secondary) unified instruction/data cache 70. BPU 50 is accessed with the prefetch address, and supplies target addresses to the prefetcher 40 for predicted changes of flow, allowing the prefetcher 40 to shift to a new code stream in one clock.

The decode stages ID1 and ID2 decode the variable length X86 instruction set. The instruction decoder 21 retrieves 16 bytes of instruction data from the prefetch buffer 30 each clock. In ID1 stage, the length of two instructions is decoded (one each for the X and Y execution pipes) to obtain the X and Y instruction pointers—a corresponding X and Y bytes-used signal is sent back to the prefetch buffer 30 (which then increments for the next 16 byte transfer). Also in ID1 stage, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2X stage to AC1Y stage, and from ID2Y stage to AC1X stage. For the exemplary embodiment, certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, PUSHA/POPA, and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 stage and AC2 stage calculate addresses for memory references and supply memory operands. The AC1 stage calculates two 32 bit linear (three operand) addresses per clock (four operand addresses, which are relatively infrequent, take two clocks). During this pipe stage, data dependencies are also checked and resolved using the register translation unit 25a (register scoreboard and register renaming hardware)—the 32 physical registers in register file 24 are used to map the 8 general purpose programmer visible logical registers defined in the X86 architecture (EAX, EBX, ECX, EDX, EDI, ESI, EBP, ESP). During the AC2 stage, the register file 24 and the unified instruction/data cache 70 are accessed with the physical address (for cache hits, cache access time for the dual ported unified cache is the same as that of a register, effectively extending the register set)—the physical address is either the linear address, or if address translation is enabled, a translated address is generated by the TLB 60. A descriptor cache 44 is used to store the most recent definitions for segmentation and the general purpose registers in register file 24. The AC control unit 25 uses the definitions of the general purpose registers in descriptor cache 44 to perform address calculations for the register file 24.

Translated addresses are generated by the TLB 60 from the linear address using information from page tables in memory and workspace control registers on chip. The unified instruction/data cache 70 is virtually indexed and physically tagged to permit, when address translation is enabled, set selection with the untranslated address (available at the end of AC1) and, for each set, tag comparison with the translated address from the TLB 60 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 stage to EX stage 23 (or in the case of floating point instructions, to the FPU 80)—because integer instructions that may still cause an exception in EX stage 23 are designated exclusive, and therefore are issued alone into both execution pipes, handling exceptions in order is ensured.

The execution stages EX_X stage 23X and EX_Y stage 23Y perform the operations defined by the instruction. Instructions spend a variable number of clocks in EX, i.e., they are allowed to execute out of order (out of order completion).

The write back WB stage updates the register file 24, condition codes, and other parts of the machine state with the results of the previously executed instruction.

Figure 2:
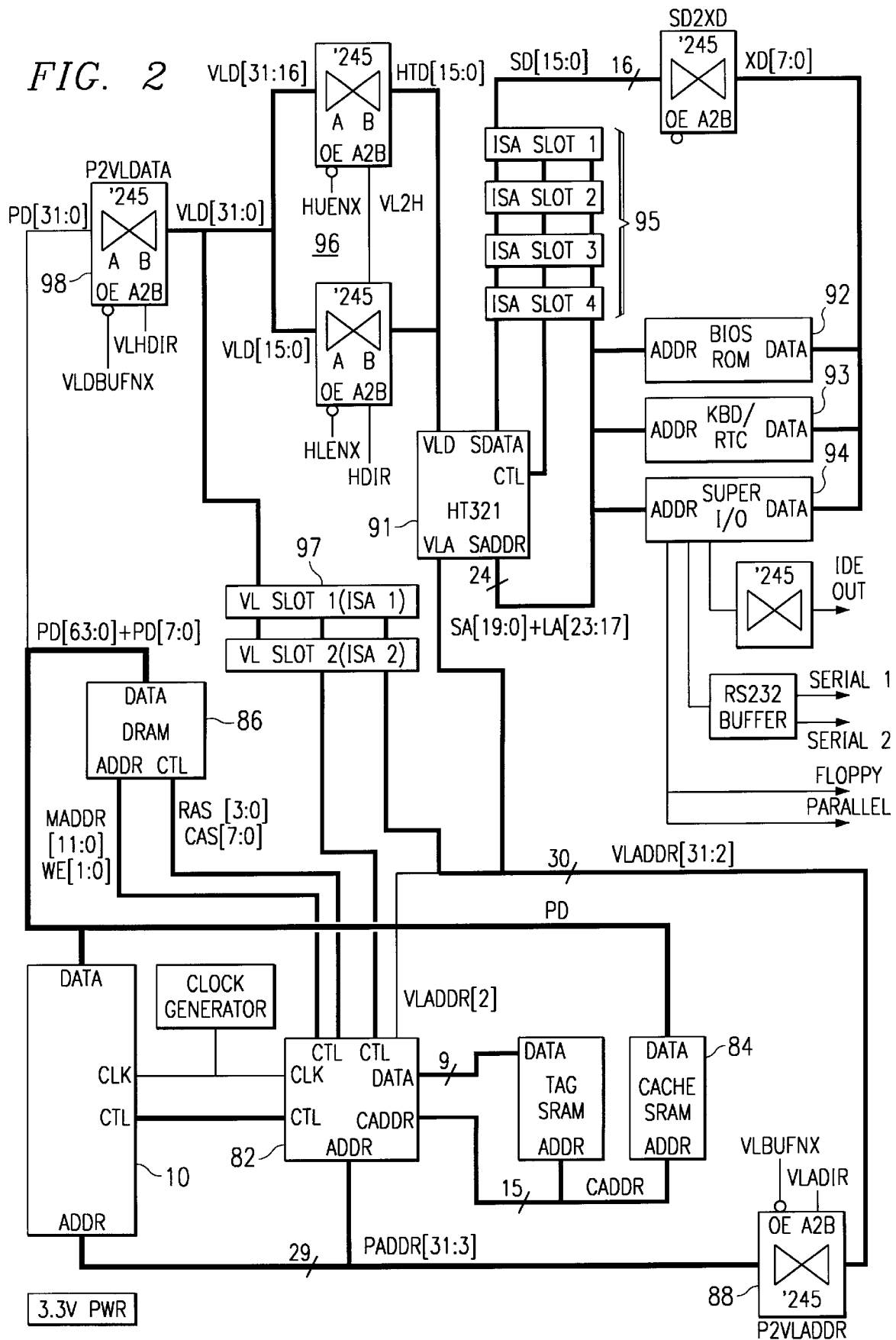
FIG. 2 illustrates an electrical diagram, in block form, of the system in which the microprocessor of FIG. 1 may be incorporated.

An exemplary system in which a processor of FIG. 1 may be used is now described with reference to FIG. 2.

For the exemplary embodiment, microprocessor 10 is used in a processor system that includes a single chip memory/bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Memory/bus controller 82 interfaces directly to the 32-bit address bus PADDR, and includes a one bit wide data port (not shown) for reading and writing registers within the controller. A bi-directional isolation buffer 88 provides an address interface between microprocessor 10 and VL and ISA buses.

Memory/bus controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The VL/ISA interface chip 91 interfaces to the 32 bit VL bus through a bi-directional 32/16multiplexer 96 formed by dual high/low word [31:16]/[15:0] isolation buffers. The VL bus interfaces to standard VL slots 97, and through a bi-directional isolation buffer 98 to the low double word [31:0] of the 64 bit processor data bus.

FIG. 3 illustrates the debug registers 42 of the preferred embodiment of the invention. Though the debug registers 42 are illustrated in FIG. 3 as adjacent registers, a person of skill in the art will appreciate that the debug registers may be anywhere in processor 10 and are not necessarily adjacent. The debug registers 42 comprise six 32 bit registers: DR0 to DR7, and may be accessed using MOV instructions while executing instructions at privilege level 0.

Four of the debug registers, the debug address registers DR0 to DR3, contain the linear address for one of four possible breakpoints. The size of the linear address may be set to 1, 2, or 4 bytes. The linear address may be an address of data in memory or to an instruction address of a program. Memory addresses in the debug registers are called data breakpoints and generate trap exceptions when a memory access of the specified type occurs to the specified address. (A trap exception is reported immediately following the instruction that generated the trap exception.) Instruction addresses in the debug registers are called instruction breakpoints and generate a fault exception when the instruction opcode is accessed. (A fault exception is reported prior to completion of the instruction that generated the exception.) Though the debug registers of FIG. 3 in the preferred embodiment contain 4 registers for setting breakpoints, a person of skill in the art will appreciate that any number of registers may be used.

Each of the breakpoints in the debug address registers DR0 to DR3 are further defined by the debug control register DR7 of FIG. 3. Debug control register DR7 contains fields Li, Gi, R/Wi and LENi for each of the debug address registers DR0 to DR3, where the letter i may be 0, 1, 2 or 3. For example, the fields L0, G0, R/W0 and LEN0 further define debug address register DR0, the fields L1, G1, R/W1 and LEN1 further define the debug address register DR1, etc. The fields in debug control register DR7 are summarized in Table 1.

TABLE 1

Debug Control Register DR7 Field Definitions

| FIELD | NUMBER OF BITS | DESCRIPTION |
|---|---|---|
| R/Wi | 2 | 00 - Break on instruction execution only<br>01 - Break on data writes only<br>10 - I/O Breakpoints<br>11 - Break on data reads or writes but not instruction fetches |
| LENi | 2 | 00 - One byte length<br>01 - Two byte length<br>10 - Not used<br>11 - Four byte length |
| Gi | 1 | 1 - Globally enable DRi for all tasks and not cleared in task switch |
| Li | 1 | 1 - Locally enable DRi for current task and is cleared in task switch |
| GD | 1 | 1 - Global disable of debug register access, bit is cleared when debug exception occurs |

The field R/Wi of the debug control register DR7 specifies the type of break for the address in the corresponding debug address register DR0 to DR3. For instruction breakpoints, R/Wi may only specify that the break occur prior to execution of the instruction that matches the instruction breakpoint. For data breakpoints, R/Wi may specify whether to break on a read or a write to the address which matches the data breakpoint. The field may also specify to break on writes to I/O addresses only.

The size of the linear address in any one of the debug address registers DR0 to DR3 may be set to 1, 2 or 4 bytes. The LENi field of the debug control register DR7 specifies the size of the linear address in the corresponding debug address registers DR0 to DR3 as 1, 2 or 4 bytes.

The field Gi of the debug control register DR7 specifies whether the breakpoint in a corresponding debug address register DR0 to DR3 is enabled for all tasks. The microprocessor in the preferred embodiment allows multitasking, i.e. the microprocessor may simultaneously execute several programs in protected mode memory addressing. These programs or tasks are switched by task switching instructions with the aid of task state segments. The field Gi, if enabled, specifies that the breakpoint in the corresponding debug address register is to be performed even if the current task is switched.

The field Li of the debug control register DR7, in contrast, specifies that the breakpoint in the corresponding debug address register is only to be performed if matched in the current task. If a task switch occurs, then the corresponding debug address register is cleared.

The bit GD of the debug control register DR7 globally disables access to all of the debug address registers DR0 to DR3, i.e. the debug address registers may not be accessed in any task. The GD bit is set to prevent overwriting of the information in the debug address registers and is cleared whenever a debug exception occurs.

The debug status register DR6 is set by the processor and reflects conditions that were in effect at the time a breakpoint in the debug address registers are matched by an instruction or data. Table 2 describes these fields in more detail.

TABLE 2

Debug Status Register DR6 Field Definitions

| FIELD | NUMBER OF BITS | DESCRIPTION |
|---|---|---|
| Bi | 1 | Bi is set by the processor if the conditions described by DRi, R/Wi, and LENi occurred when the debug exception occurred, even if the breakpoint is not enabled via the Gi or Li bits. |
| BT | 1 | BT is set by the processor before entering the debug handler if a task switch has occurred to a task with the T bit in the TSS set. |
| BS | 1 | BS is set by the processor if the debug exception was triggered by the single step execution mode. |

The field Bi of the debug status register DR6 specifies for its corresponding debug address register if the conditions described by Dri, R/Wi and LENi are matched. The processor sets this bit even if the breakpoint is not enabled due to the settings of the Gi or Li bits.

The field BT of the debug status register DR6 is set by the processor before entering the debug interrupt handler if a task switch has occurred to certain tasks. The field BS is set by the processor if the debug exception was triggered by the single step execution mode. Setting a TF bit in the configuration register EFLAGS, initiates a single-step execution mode wherein the processor generates a software debug exception after the execution of every instruction.

In operation, an instruction is fetched and decoded by the instruction decoder 21. The processor then compares the linear instruction address to the breakpoint addresses in the debug address registers DR0 to DR3. If a match occurs, then a debug fault exception is generated, and control of the processor is switched to a software debug interrupt handler. If a match does not occur, the AC stage 22 calculates the data (operand) addresses for the instruction, and these data addresses are compared to the breakpoint addresses in the debug address registers DR0 to DR3. The instruction is then executed. If a match of the data addresses occurred, a debug trap exception is generated, and control of the processor is switched to a software debug interrupt handler. If a match of the data addresses failed to occur, then no exception is generated.

Other methods of creating interrupts and exceptions exist. For example, assertion of one of three interrupt pins, NMI, SMM and INTR, generates a hardware interrupt. Software interrupts (or exceptions) may be generated by placing the breakpoint instruction INT 3 at the location in the program where control is to be regained after the exception. In addition, as explained above, single step execution mode is initiated by setting the TF bit in the control register EFLAGS. A person of skill in the art will appreciate that the method and apparatus of the present invention may also be utilized with these other methods of creating interrupts and exceptions.

In addition, other debugging and diagnosing methods exist which may be used in conjunction with the present invention. A logic analyzer connects to each pin of the processor and outputs onto a viewing screen, the output signals of each pin. The logical analyzer may also decode some of the pin signals such as the bus cycle types. A logic analyzer is often used in conjunction with the debug registers 42 when diagnosing and debugging a processor. For example, if the logical analyzer reveals an error in a group of instructions, the instruction addresses are then set as a breakpoints in the debug address registers to further isolate and diagnose the error.

In the preferred embodiment of the invention, a set of debug configuration registers enable additional features and control of the debug registers. FIG. 4 illustrates this set of debug configuration registers DBR0 to DBR3, DCR0 and DOR0. Each of the fields of the debug configuration registers is summarized in Table 3. In the present embodiment, the configuration registers DBR0 to DBR3, DCR0 and DOR0 may be accessed by executing two I/O instructions: an I/O write to 22 h specifying the register to be accessed and then an I/O read or write to 23 h to access the data in the specific register.

TABLE 3

Definitions of Debug Configuration Registers

| Configuration Register | Field | No of Bits | Description |
| --- | --- | --- | --- |
| DBR0 | TBI | 1 | Indicates a two byte opcode |
|  | DEBUG12 | 1 | Enables matching on lower 12 bits of debug address register DR0 |
|  | JTAG | 1 | Enables break to JTAG in response to debug exception |
|  | SMI |  | Enables break to SMI in response to debug exception |
| DBR1 | HOLDF | 1 | Specifies mode of execution of isolated instruction |
|  | HOLDB | 1 | Specifies mode of execution of isolated instruction |
|  | REAL MODE | 1 | Specifies processor is operating in real mode |
|  | PROT MODE |  | Specifies processor is operating in protected mode |
|  | VM86 MODE | 1 | Specifies processor is operating in virtual 8086 mode |
|  | MBYTE | 3 | Specifies 3 bits of the mod r/m byte |
| DBR2 | MBYTE MASK | 3 | Enables masking of bits of MBYTE |
|  | AD SIZE 16 | 1 | Specifies an address size of 16 |
|  | AD SIZE 32 | 1 | Specifies an address size of 32 |
|  | OP SIZE 16 | 1 | Specifies an operand size of 16 |
|  | OPSIZE 32 | 1 | Specifies an operand size of 32 |
| DBR3 | OPCODE BYTE MASK | 8 | Enables masking of the opcode byte in DEBUG OPCODE |
| DCR0 | DEBUG COUNTER | 8 | The number of counts of an instruction breakpoint before generating a debug exception |
| DOR0 | DEBUG OPCODE | 8 | Specifies one byte of opcode for an instruction to be isolated |

A detailed description of the operation of the debug configuration registers DBR0 to DBR3, DCR0 and DOR0 in conjunction with the debug address registers DR0 to DR3 will now follow.

Write Protection of the Debug Registers

The diagnosing and debugging of operating systems is often difficult because at boot-up or restart, an operating system automatically clears the debug address registers DR0 to DR3, and thus breakpoints to debug exceptions cannot be generated. This disadvantage makes the diagnosing and debugging of operating systems difficult.

In the present invention, the debug registers DR0 to DR3 can be write protected by setting a bit in a register. This bit indicates whether write protection of the debug registers is enabled. In the preferred embodiment, bit 14 of debug register DR7 is used as the write protect bit because in many processors (though not processor 10 of the preferred embodiment), such as the x86 family of Intel processors, this bit will stall or hang the processor. Thus, no operating systems or other software use this bit in operation. Though bit 14 of debug register DR7 is used in this embodiment, a person of skill in the art will appreciate, that the write protect bit may be assigned to any bit in a register in the processor that is not otherwise used by the processor or software.

In use, the write protect bit is accessed and enabled by a MOV instruction executed at privilege level 0. The operating system is then restarted and the debug address registers are not cleared by the operating system. The invention thus allows the debug address registers DR0 to DR3 to contain breakpoints for the operating system at boot-up which facilitates the debugging and diagnosing of operating systems. The write protect bit will also ensure that other software in use does not overwrite the debug registers DR0 to DR3.

Loop Counter

In the prior art, exceptions are generated only at the first occurrence of a breakpoint in the debug address registers DR0 to DR3. This hinders diagnosing and debugging of the processor when errors occur in the execution of a program at the second, third or greater occurrence of a breakpoint. In the present invention, a breakpoint, either a data or instruction address, is written to one of the debug address registers DR0 to DR3. A breakpoint counter counts down from a predefined number X, such that the exception does not occur until the Xth occurrence of the breakpoint.

Figure 5:
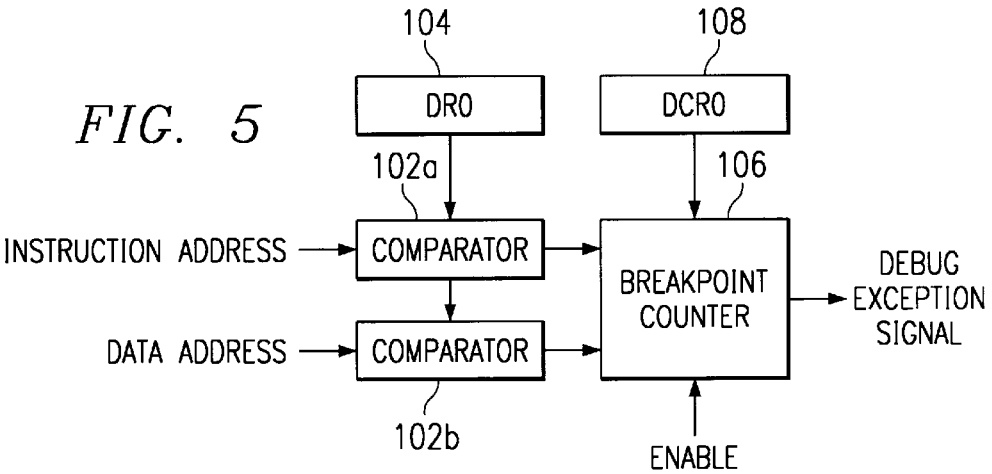
FIG. 5 illustrates, in block diagram form, a breakpoint counter incorporated into the present invention.

The breakpoint counter is shown in more detail in FIG. 5. The breakpoint of debug register DR0 104 is input to comparators 102a and 102b. Instruction addresses from the ID1 stage of instruction decoder 21 are input to comparator 102a while data addresses from TLB 60 are input to comparator 102b. Comparators 102a and 102b compare the instruction addresses and data addresses to the breakpoint in debug register DR0.

The outputs of comparators 102a and 102b are input to 8 bit programmable breakpoint counter 106. In addition, the debug configuration register DCR0 108 is input to breakpoint counter 106 which is programmed with the count number stored in DCR0 108. Breakpoint counter 106 has an output for signaling a debug exception. In the present embodiment, the breakpoint counter is only enabled for breakpoints in debug register DR0, however, a person of skill in the art will realize that the present invention may be implemented with any number of the debug registers DR0 to DR3.

Figure 6:
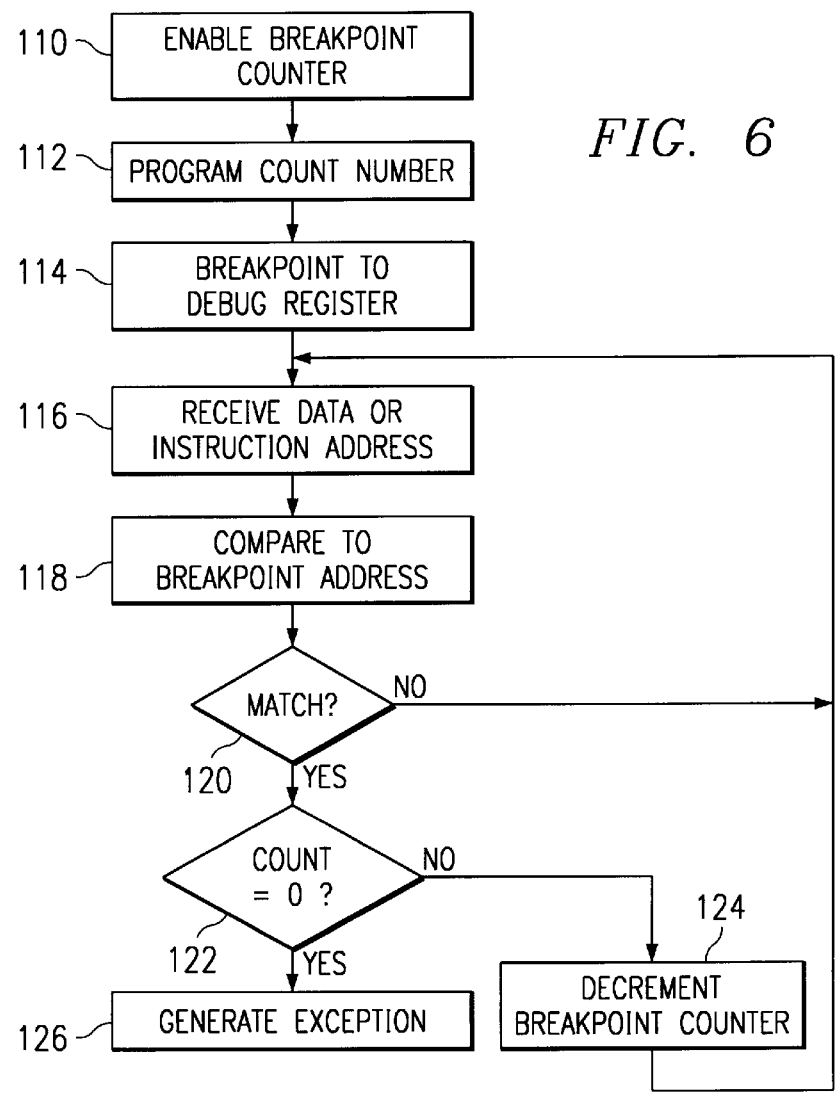
FIG. 6 illustrates a flow chart of the operation of the breakpoint counter of the present invention.

The operation of breakpoint counter 106 is explained with reference to the flow chart in FIG. 6. The breakpoint counter 106 is first enabled as shown in block 110. In the present embodiment, the breakpoint counter 106 is enabled by the write protect bit, bit 14 of DR7, though a person of skill in the art will appreciate that any bit in a register may be assigned to enable the breakpoint counter 106. Thus, if the write protect bit is enabled, the debug registers are not only write protected, but the breakpoint counter 106 is enabled as well.

The count number of the debug counter 106 is stored in debug configuration register DCR0 108. If debug configuration register contains no count number, then the debug counter 106 defaults to a count of one. An instruction or data address breakpoint is then written to DR0 as shown in block 114. As shown in block 116, comparators 102a and 102b receive the instruction address and data addresses for each instruction processed by the processor 10.

Comparators 102a and 102b then compare the breakpoint in debug register DR0 104 to the instruction or data address as shown in block 118. If the breakpoint and selected address fail to match, then the circuit waits for another instruction or data address. If the breakpoint and selected address match, then it is determined if the number of matches equal the count number, as depicted in block 122. If not, then the breakpoint counter is decremented in block 124, and the circuit again waits for another instruction or data address. If the number of matches equals the count number, then a signal is generated to initiate a debug exception, as depicted in block 126.

By thus providing for a breakpoint at the Xth occurrence of a breakpoint equal to the count number in DCR0, the present invention allows errors that fail to occur in the first occurrence of an instruction to be analyzed and debugged.

Match on Lower 12 bits

The physical address is the address which actually selects the memory where a required byte is located. The linear address is the same as the physical address except when paging is in effect. The linear address and the physical address of a byte in memory will then differ, but, even if paging is in effect, the lower 12 bits of the physical and linear address to the same byte of memory will be the same.

The debug address registers DR0 to DR3 usually match on the linear address of the data or instruction address. However, the linear address of an instruction or data is sometimes difficult to determine when diagnosing or debugging a stream of instructions because a logical analyzer or other debugging technique may only output the physical address of data and instructions in a stream of instructions. Then only the physical address and not the linear address of the desired breakpoint is known. It would thus be desirable to be able to generate a breakpoint on a physical address.

The present invention allows the debug registers to match on the lower 12 bits of the debug address registers DBR0 to DBR3 only, i.e. the upper 20 bits will be masked. The bit DEBUG12 in debug configuration register DBR0 and the write protect bit controls this feature. If DEBUG12 bit is not enabled, the debug registers DR0 to DR3 will match when the entire 32 bits of the breakpoint matches an instruction or data address. If the write protect bit and the DEBUG12 bit are enabled, then the debug registers will match when the lower bits 0–11 of the breakpoint matches the lower bits 0–11 of an instruction or data address.

The operation of the present invention will now be explained with reference to FIG. 7. The physical address of an instruction or data is input to one of the debug address registers DR0 to DR3 as shown in block 128 and the write protect bit and DEBUG12 bit are enabled as depicted in block 130. The linear data or instruction addresses are received by the debug address registers DR0 to DR3 and the data read address, data write address or instruction address is selected in response to the R/Wi bit, as explained with reference to FIG. 6. A comparator then compares the lower 12 bits of the debug address registers to the lower 12 bits of the selected linear address of the instruction or data type. If a match occurs, a debug exception is generated as shown in block 136. If a match fails to occur, the process returns to block 132 to wait for another data or instruction address.

By matching on the lower 12 bits, the present invention enables the use of physical addresses in the debug registers as breakpoints. Since the physical address is often more easily determined than the linear address, the present invention facilitates the debugging and diagnosing process.

Destination on Break

Each interrupt and exception in processor 10 is assigned one of 256 interrupt vector numbers. In response to an exception or interrupt, the processor 10 locates an entry in an interrupt descriptor table (IDT) corresponding to the interrupt vector number. The entry in the interrupt descriptor table points to the interrupt handler.

For example, a debug exception is generated when a memory access of the specified type occurs or a given code access occurs to the specified breakpoints in the debug address registers DR0 to DR3. (Debug exceptions for a previous instruction and the next instruction always take precedence over other interrupts and exceptions.) The processor 10 locates the interrupt vector number corresponding to debug exceptions which, in the present embodiment, is interrupt vector number 1. The processor then locates the entry in the interrupt descriptor table corresponding to interrupt vector number 1. The entry points to a debug interrupt handler (also called an interrupt service routine). Program control is transferred to this debug interrupt handler.

Most debug interrupt handlers have the disadvantage of limited visibility to the processor state and only the contents of the register set and physical memory may be ascertained. Other data, such as the instruction prefetch addresses, the type of prefetch, and data addresses in the X and Y pipelines, can not be accessed. Furthermore, there is no control over the operation of debug interrupt handlers in operating systems or other software. So the operation of the operating system's debug interrupt handler may not be helpful in the debugging and diagnosing of a particular error occurring in the processor 10 during the execution of the operating system.

The present invention allows program control to transfer to other debugging mechanisms besides a debug interrupt handler in response to a debug exception. By enabling the JTAG bit in debug control register DBR0, the present invention will initiate a JTAG routine rather than a debug interrupt handler in response to a debug exception. Alternatively, by enabling the SMI bit in debug control register DBR0, the present invention will initiate an SMI interrupt service routine rather than a debug interrupt handler in response to a debug exception.

The operation of the present invention will now be explained in more detail with reference to FIG. 8. In block 138, a breakpoint in the debug address registers DR0 to DR3 is matched with an instruction or data address and a debug exception is generated. The processor 10 then detects whether SMI bit or JTAG bit of DBR0 is enabled, as shown in block 140. If not, then a debug interrupt handler is initiated. If so, then the processor 10 determines whether the JTAG bit or the SMI bit is the bit enabled, as shown in decision block 144. If the JTAG bit is enabled, then a JTAG routine is initiated as shown in block 146.

The JTAG routine is the Joint Test Access Group protocol for communications, IEEE standard 1149.1, which is incorporated by reference herein. The JTAG routine allows the processor state of processor 10 to be recorded and supplied as serial data. Five pins of processor 10 (Test clock TCK, Test Data Input TDI, Test Data Output TDO, Test Mode Select TMS and Test Reset TRST#) provide the interface between the JTAG routine and the processor 10. When a JTAG routine is initiated, the processor clock is stopped and clock control is switched to an external clock input TCK. The TCK is used to clock information into the processor 10 using the TMS and TDI pins and to clock data information out of the processor 10 using the TDO pin.

In the present embodiment of the invention, the JTAG routine is initiated, as shown in block 146, in response to a debug exception. The debug exception signals the JTAG routine to halt the processor clock. The processor state is retained by the processor because no other operations are performed. When activity ceases in the processor, the person debugging the processor 10 initiates the TRST# signal and the TCK clock signal to start the JTAG routine. Alternatively, the JTAG routine may be initiated automatically in response to a debug exception through an acknowledge handshake bus cycle between processor 10 and the JTAG routine. The JTAG routine can then scan the data in processor 10's registers or the processor 10's pin state and output the data onto the TDO pin.

Alternatively, if in decision block 144, the SMI bit is enabled, an SMI exception is generated which triggers an SMI interrupt, as depicted in block 148. An SMI interrupt can also be triggered by executing an SMINT instruction or by an active signal on pin SMI#. After an SMI interrupt, certain portions of the processor state are automatically saved, system management mode (SMM) is entered, and an SMI interrupt service routine begins execution at the base of SMM address space. SMM usually provides for system power management or software transparent emulation of I/O peripherals. However, the SMI service routine is user definable, and may be used to save the state information of processor 10. Running in SMM address space, the SMI service routine does not interfere with the operating system or any application program. After entering the SMI service routine, instructions, MOV, SVDC, SVLDT and SVTS, can be used to save additional processor state information. The save instruction SVDC, SVLDT and SVTS are summarized in the table below. To recognize the SMI interrupt, the SMI# pin must be 0, SM3 (CCR1, bit 7) equal to 1, ARR3 (Size 3–0)>0 and SMAC (CCR1, bit 2) equal to 1.

TABLE 4

SMM Save Instructions

| Instruction | Opcode | Format | Description |
|---|---|---|---|
| SVDC | OF 78 (mod sreg3 r/m) | SVDC mem80, sreg3 | Saves segment registers (DS, ES, FS, GS, or SS) to mem80 |
| SVLDT | OF 7A (mod 000 r/m) | SVLDT mem80 | Saves Local Descriptor Table to mem80 |
| SVTS | OF 7c (mod 000 r/m) | SVTS mem80 | Saves Task State Register (TSR) to mem80 |

The SMI service routine provides for improved visibility of the processor state without interfering with the operating system or any application program. In addition, since the SMI service routine is already present in processor 10, no additional hardware is necessary.

The present invention thus provides for additional flexibility in the destination of processor control after a debug exception. Not only can the present invention break to a debug interrupt handler, but can also break to either a JTAG routine or to SMM mode in response to a debug exception. The present invention thus provides for additional access to processor state information not previously available which facilitates the debugging and diagnosing of processor 10.

Single Step Execution to SMI

Setting the TF bit in the configuration register EFLAGS, initiates a single-step execution mode wherein the processor generates a debug exception after the execution of every instruction. A software debug interrupt handler is usually initiated in response to each debug exception.

The present invention overrides the debug interrupt handler and allows the initiation of an SMI interrupt after single step execution. The present invention is enabled by the combination of the write protect bit (bit 14 of DR7) and the TF bit. A person of skill in the art however will appreciate that any bit or combination of bits not otherwise in use by the processor or software may be used to enable the present invention. In the present embodiment, if both the write protect bit and the TF bit are enabled, an SMI exception is generated after each instruction, rather than a software debug interrupt handler.

The operation of the present invention is explained in more detail with respect to FIG. 9. After each instruction is executed, the processor 10 determines whether the TF bit is enabled, as depicted in block 152. If not, the processor continues to execute instructions. If TF bit is enabled, then the processor 10 determines whether the write protect bit is enabled as shown in block 154. If the write protect bit is not enabled, then a debug interrupt handler is initiated, as depicted in block 156. If the write protect bit is enabled, than an SMI exception is generated which triggers an SMI interrupt, as shown in block 158. The SMM mode is then initiated as explained hereinabove.

The present invention provides flexibility in enabling the processor to break to either an SMI routine or a debug interrupt handler. This invention thus enables more information about the processor state to be accessed through an SMI routine which facilitates the diagnosing and debugging of a processor.

Single Instruction Issuance

Often the errors detected in executing an instruction are due to the interactions of the instruction with other prior or subsequent instructions. The present inventions allows an instruction to be executed in an execution pipeline, in isolation from prior instructions or subsequent instructions or both. By isolating an instruction, an instruction which has a detected problem with interaction with other instructions may be successfully executed in order to find additional errors further down in the stream of instructions.

Figure 10:
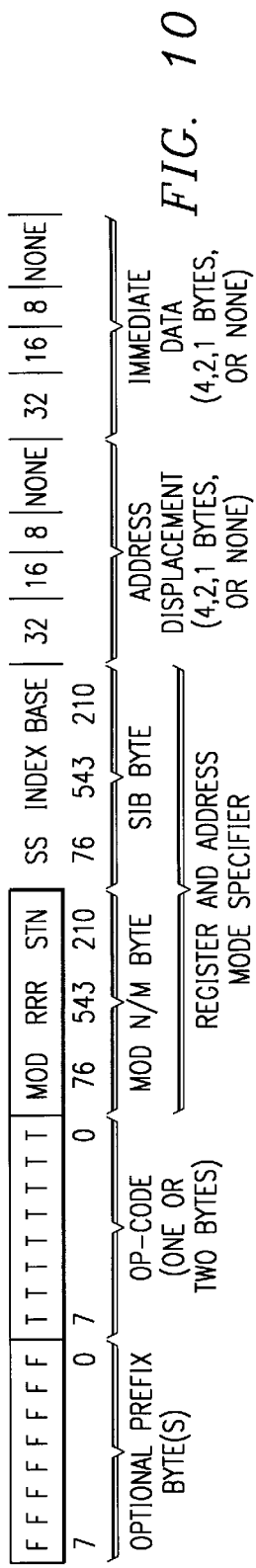
FIG. 10 illustrates a typical instruction format of the present invention.

An instruction to be isolated is identified using the debug configuration registers DBR0, DBR1, DBR2, DBR3 and DOR0, shown in FIG. 4. A typical instruction format is shown in FIG. 10. The typical instruction format shown in FIG. 10 includes an optional prefix byte or bytes, a one or two byte opcode, a mod r/m byte, an s-i-b byte, optional address displacement byte(s), and optional immediate data byte(s). These fields are defined in Table 5 below.

TABLE 5

| Field Name | Description | Width |
|---|---|---|
| Optional Prefix Byte(s) | Specifies segment register override, address and operand size, repeat elements in string instruction, Lock# assertion | 1 or more bytes |
| Opcode Byte(s) | Identifies instruction operation | 1 or 2 bytes |
| mod and r/m Byte | Address mode specifier | 1 byte |
| s-i-b byte | Scale factor, Index and Base fields | 1 byte |
| Address Displacement | Address displacement operand | 1,2 or 4 bytes |
| Immediate Data | Immediate data operand | 1,2 or 4 bytes |

The processor 10 includes two opcode address maps. The first opcode address map is for one byte opcodes, and the second opcode address map is for two byte opcodes. (An opcode is either one or two bytes.) If the opcode address is one byte, the processor 10 decodes the opcode with the first address map. If the opcode is two bytes, the first byte is always 0F which indicates to the processor 10 to decode the opcode with the second address map.

To identify an opcode in the debug configuration registers, a one byte opcode is stored in the configuration register DOR0 of FIG. 4. If the opcode is two bytes, i.e. the first byte is 0F, then TBI bit, bit 7 of configuration register DBR0, is enabled and the second byte is stored in the configuration register DOR0. The TBI bit indicates that the processor should use the second instruction address map to decode the instruction address.

The bits of the instruction opcode stored in debug configuration register DOR0 may be masked using debug configuration register DBR3. The masking enables a range of instructions to be executed in isolation. For example, if the opcode address 0F 22 (corresponding to a MOV instruction of DR0, DR1, DR2 or DR3 to a register) is stored in the debug configuration registers, then the TBI bit is enabled to indicate a two byte opcode and 22 h (00100010 in binary) is stored in debug configuration register DBR3. Any one of the 8 bits of the binary code can then be masked by placing a 1 in the corresponding bit position of the debug configuration register DBR3. If (00000011) is placed in DBR3, the last two bits in DOR0 are masked, and any two byte instruction within the range 20 h (00100000) to 23 h (00100011) will be identified by the debug configuration registers. The ability to mask bits is especially helpful when a group of operations have opcodes within a specified range. For example, the above opcode 0F 22 is part of a group of operations for moving to/from control registers, debug registers, and test registers within the opcode address range of 0F 20 to 0F 26.

The mod r/m byte of the instruction, shown in FIG. 10, further defines the opcode by selecting the type of memory addressing to be used. Three bits of the mod r/m byte, bits 5 to 3, are important in the decoding of the opcode because the bits are sometimes used as opcode extension bits. For instructions that include the bits 5 to 3 of the mod r/m byte, these three bits are specified in the MBYTE bits of debug configuration register DBR1. For instructions that do not include the bits 5 to 3 of the mod r/m byte, the three bits are masked using the MBYTE MASK bits in debug configuration register DBR2.

The three bits Real Mode, Protected Mode, and VM86 Mode, in debug configuration register DBR1 of FIG. 4 specify in which mode of addressing a match of the identified instruction is enabled. The Real Mode bit is set to enable a match in real mode memory addressing, the Protected Mode bit is set to enable a match in protected mode memory addressing, and the VM86 Mode bit is set to enable a match in virtual 8086 mode memory addressing. For example, if none of the three mode bits are set, then no match is enabled in any addressing mode. If the Real Mode bit and the VM86 Mode bit are set, then the match is enabled in either of these addressing modes.

The bits AD size 16, AD size 32, Op size 16, and Op size 32 of debug configuration register DBR2 enable a match in the specified address or operand size of an instruction. The Op size 16 and Op size 32 bits specify a 16 bit or 32 bit operand size for the instruction while the AD size 16 and AD size 32 specify a 16 or 32 bit address size. For example, if the Op size 16 bit and Op size 32 bit are both set, then a match is enabled for both operand sizes. If neither Op size 16 nor Op size 32 is set, then no match is enabled for either size operand. Similarly, if the AD size 16 bit and AD size 32 bit are both set, then a match is enabled for either size address while if neither the AD size 16 nor the AD size 32 bit are set, then no match is enabled for either address size.

The HOLDF and HOLDB bits control the mode of execution of an instruction identified in the debug configuration registers. If both bits are enabled, then the processor executes an instruction matched to the identified instruction in isolation from both prior and subsequent instructions. If the HOLDF bit is enabled and the HOLDB bit is not enabled, then the processor executes the matched instruction in isolation from prior instructions only. If the HOLDB bit is enabled and the HOLDF bit is not enabled, then the processor executes the matched instruction in isolation from subsequent instructions only.

Figure 11:
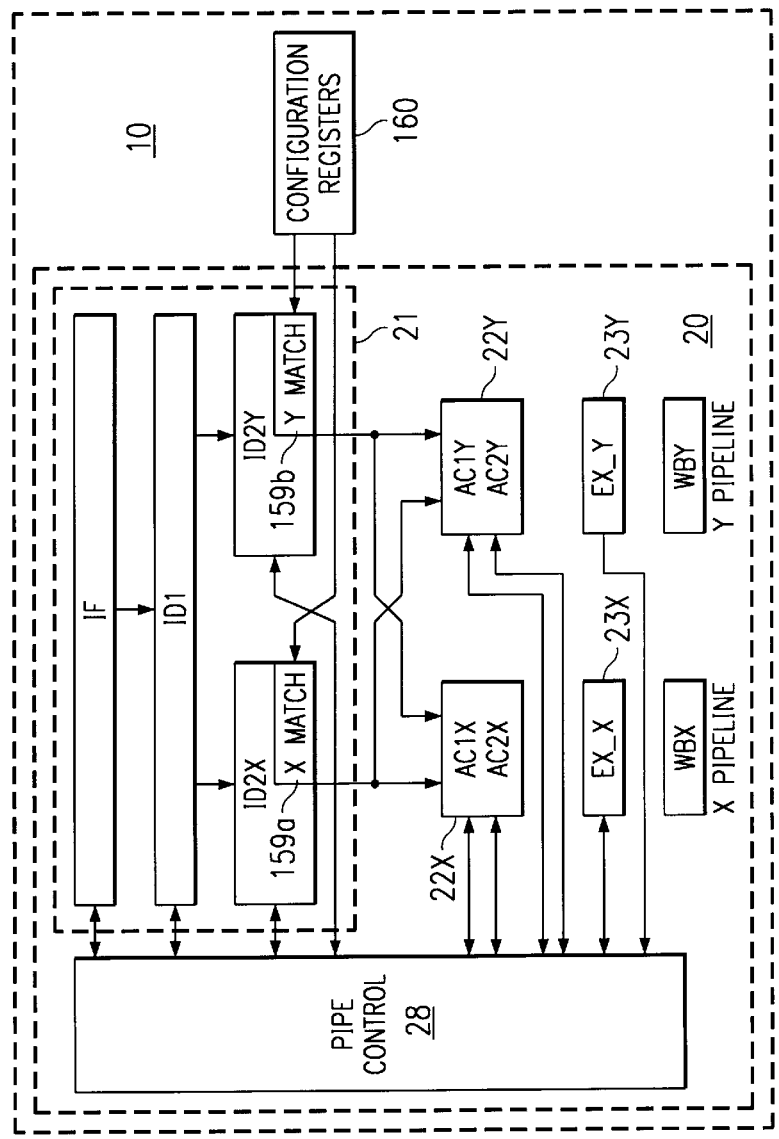
FIG. 11 illustrates the execution core and debug configuration registers of the processor of the present invention in more detail.

The execution core 20 of processor 10 and the debug configuration registers which incorporate the present invention is shown in more detail with respect to FIG. 11. Each of the stages of the pipeline has an input from pipe control unit 28 and an output to pipe control unit 28. A stage of the pipeline outputs a DELAY signal to the pipe control unit 28 if the stage needs more time to complete an instruction. In addition, the pipe control unit 28 inputs a STALL signal to a stage if the stage cannot transfer an instruction to the succeeding pipe stage because that succeeding stage is delayed or stalled.

The debug configuration registers 160 are located within processor 10 in the memory subsystem. The debug configuration registers have outputs connected to ID2X and ID2 Y. The ID2X and ID2Y stages include comparator units 159a and 159b. Though the debug configuration registers 160 are located outside of the execution core 10, a person of skill in the art will appreciate that the debug configuration registers may be located anywhere within processor 10.

In operation, the instruction fetch IF fetches an instruction and the ID1 stage decodes the instruction. If the instruction is passed to the ID2X stage, then the comparator unit 159a in ID2X stage compares the decoded instruction with the instruction identified in the debug configuration registers and determines whether the instructions match. Similarly if the instruction is passed to the ID2Y stage, then the comparator unit 159b in the ID2Y stage compares the decoded instruction with the instruction identified in the debug configuration registers and determines whether the instructions match. If a match occurs in either ID2X or ID2Y, the particular ID2 stage determines whether the HOLDF or HOLDB bit or both bits is enabled. If the HOLDF bit is enabled, the pipe control unit 28 stalls the matched instruction in the particular ID2 stage until both the X and Y pipelines complete execution of any prior instructions and contain no further instructions. The matched instruction is then executed by either the X or Y pipeline as normal along with any subsequent instructions. Due to the ability of the present invention to switch instructions from ID2X to the Y pipeline or from ID2Y to the X pipeline, an instruction may be matched in the ID2X stage but executed in the Y pipeline or it may be matched in the ID2Y stage but executed in the X pipeline.

If the HOLDB bit is enabled, the matched instruction is executed by either pipeline as normal along with prior instructions. However, the pipe control unit 28 stalls the next instruction (after the matched instruction) in the ID2 stage until the matched instruction has completed execution.

If the HOLDB and HOLDF bits are enabled, the pipe control unit 28 stalls the matched instruction in the ID2 stage until the X and Y pipeline complete execution of any prior instructions and contain no further instructions. The matched instruction is then executed by either the X or Y pipeline while the pipe control unit stalls any subsequent instructions in the ID2 stage. When the matched instruction has completed execution, the subsequent instructions are executed as normal.

With the use of the HOLDF and HOLDB bits, the present invention allows an identified instruction to be executed in isolation from subsequent instructions or from prior instructions or from both. This ability enables a person debugging a stream of instructions to execute an instruction with interaction errors and proceed with diagnosing and debugging the remainder of the stream of instructions. In addition, using all three above alternatives of executing an instruction in isolation, errors in the execution of an instruction may be determined as arising from interactions with prior instructions or interactions with subsequent instructions or neither.

Visibility

In the present invention, the bus interface unit (BIU) 90 of processor 10 outputs information about the processor state onto the external pins of processor 10 during idle bus cycles under the control of visibility register 46 in the BIU 90. A first visibility bit in visibility register 46 enables the output of information during idle bus cycles, and a second bit in visibility register 46 specifies a first mode A, while a third bit in visibility register 46 specifies a second mode B.

In mode A, the BIU 90 outputs a prefetch address of the current instruction on the external system address pins, and the data addresses in the X and Y pipelines on the external data pins. In mode B, the BIU 90 outputs data from internal registers on the address and data pins. Other modes which output other information, such as the type of prefetch, may also be defined. In addition, other pins of the processor 10 may also be used to output information. For example, Byte Enable pins BE7# to BE0#, may be used to output information.

FIG. 12 illustrates the external pins of processor 10 used in the present invention. Interface to external pins is through (BIU) 90. The BIU 90 includes three interface units: a Data Input/Output 90*a*, a System Address Unit 90*b* and a System Bus Control Unit 90*c*. The Data Input/Output 90*a* interfaces to the external 64 bit data address bus D63–D0; the System Address Unit 90*b* interfaces to the external address bus A31–A3 and the Byte Enable signals BE7#–BE0#; and the System Control Bus Unit 90*c* interfaces to bus control signals such as ADS#. Also shown in FIG. 12 is an Anti-Hang pin which is explained in more detail below.

The operation of the present invention is explained in more detail with reference to FIG. 13. The bus interface unit 90 continually monitors for an idle bus cycle, as shown in block 161. If an idle bus cycle occurs, the bus interface unit 90 determines if the visibility bit in visibility register 46 is enabled, as depicted in block 162. If not, the bus interface unit 90 continues to monitor for idle bus cycles. If the visibility bit is enabled, the bus interface unit determines whether mode A or mode B is specified in visibility register 46. If mode A, the bus interface unit 90 detects the prefetch data and X and Y addresses using internal 32-bit address bus ADS and 64-bit data bus DBS, shown in FIG. 1. If mode B, the bus interface unit 90 detects data in internal registers, as shown in block 168, also using the address bus ADS and data bus DBS.

The bus interface unit 90 then outputs the detected data onto external pins A31–A3, D63–D0, or BE7#–BE0#, as shown in block 170. During the output of information in the idle bus cycle, the bus interface unit 90 does not activate the Address Strobe signal ADS#. The ADS# signal indicates that the processor has driven a valid address and bus cycle definition on the appropriate output pins. By not activating the ADS# signal, the bus interface unit ensures that the information output on the pins is ignored by other system components.

A logical analyzer or other debugging hardware aid may then be used detect the output on the external pins. It will be understood that the data output in response to an idle bus cycle occurs when the ADS# signal is not asserted.

The present invention provides far greater access to the processor state without interfering with the normal execution of instructions. Plus, by providing for more than one mode of output information, the present invention provides flexibility over the data output which also facilitates the diagnosing and debugging process.

Anti-Hang Pin

Processor 10 includes three common external interrupts, the Non-Maskable Interrupt (NMI) pin, Maskable Interrupt (INTR pin), and the SMM Interrupt (SMI# pin). Each of these interrupts transfers control to an interrupt routine after the current instruction has been completed. (Long string operations have interrupt windows between memory moves that allow interrupts to be acknowledged.) Exceptions generated by an interrupt instruction or a program error or a breakpoint in the debug registers, are either traps, faults or aborts. As explained above, trap exceptions are reported immediately following the instruction that generated the trap exception and fault exceptions are generated prior to completion of the instruction that generated the exception. An abort exception is a type of fault exception generated when the processor 10 cannot restart the program at the faulting instruction. All of these exceptions and interrupts are generated on an instruction boundary, i.e. prior to or after the execution of an instruction. If the processor hangs or stalls in the middle of an instruction, none of these interrupts or exceptions can shift control of the program. The only method to resume execution is to restart or re-boot the processor which clears the processor state information necessary to diagnose and debug the error.

To resolve this problem, the present invention includes an Anti-Hang pin shown in FIG. 12. The Anti-Hang pin forces processor 10 to generate an SMI interrupt in the middle of the execution of an instruction.

The operation of the present invention is explained in more detail in relation to FIG. 14. During the execution of a stream of instructions, the processor stalls or hangs in the middle of execution of one instruction, as depicted in block 172. An active signal is then generated on the Anti-Hang pin, as shown in block 174. The Anti-Hang pin is directly connected to the interrupt handler of processor 10. The active signal on the anti-hang pin forces the interrupt handler to generate an SMI interrupt, as depicted in block 176. The SMI interrupt automatically saves certain portions of the processor state and system management mode (SMM) is entered, as explained above. Again, to recognize the SMI interrupt, the SMI# pin must be 0, SM3 (CCR1, bit 7) equal to 1, ARR3 (Size 3–0)>0 and SMAC (CCR1, bit 2) equal to 1.

After the SMI service routine saves and/or outputs the processor state, the processor can not return to the execution of the original stream of instructions, as shown in block 178. The processor 10 must be restarted or re-booted to attempt to run the stream of instructions again.

By forcing an SMI interrupt in the middle of the execution of an instruction, the present invention allows access to the processor state when the processor hangs or stalls in the middle of an instruction. This is a great advantage when diagnosing and debugging a processor that is experiencing one of the most serious errors in executing instructions.

From the above description of the invention, a person skilled in the art can appreciate the advantages of the present invention. While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of detecting processor state information in a processor which includes a plurality of external pins for communicating information, comprising:

selecting in a visibility register at least one of a plurality of a modes that identify processor state information;

detecting an idle bus cycle by a bus interface unit of the processor; and outputting, by the bus interface unit, the processor state information identified in the selected mode onto the external pins of the processor in response to detecting the idle bus cycle.

2. The method of claim 1 wherein the step of selecting in a visibility register at least one of a plurality of a modes that identify processor state information, comprises the steps of:

selecting a first mode by setting the visibility register to a first state, wherein the first mode identifies processor state information which includes prefetch instruction data and data addresses; and selecting a second mode by setting the visibility register to a second state, wherein the second mode identifies processor state information which includes data contained in internal registers of the processor.

3. The method of claim 2 wherein the step of outputting the processor state information identified in the selected mode onto the external pins of the processor in response to detecting an idle bus cycle comprises the steps of:

detecting the processor state information identified in the selected mode using internal data and address buses; and outputting the processor state information identified in the selected mode onto external address pins and external data pins of the processor.

4. The method of claim 3 wherein the step of outputting the processor state information identified in the selected mode onto the external pins of the processor in response to detecting an idle bus cycle further comprises the step of indicating that the outputting step is not a valid bus cycle.

5. The method of claim 4 wherein the step of indicating that the outputting step is not a valid bus cycle comprises the step of deactivating an address signal that indicates a presence of a valid address and bus cycle on the external pins.

6. The method of claim 1 further comprising the step of detecting the processor state information output onto the external pins with debugging hardware.

7. The method of claim 6 wherein the debugging hardware is a logical analyzer.

8. A processor capable of outputting processor state information during idle bus cycles, comprising:

a plurality of external pins for communicating data from the processor;

a visibility register for selecting one of a plurality of modes which identifies processor state information to output onto the plurality of external pins;

a bus interface unit for communicating data to the plurality of external pins of the processor and for detecting an idle bus cycle; and wherein the bus interface unit outputs processor state information according to the identified mode onto the plurality of external pins in response to detecting the idle bus cycle.

9. The processor of claim 8 wherein the visibility register for selecting at least one of a plurality of modes which identifies processor state information to output on external pins comprises a visibility register for selecting either a first mode which identifies prefetch instruction data and address data or for selecting a second mode which identifies data contained in internal registers.

10. The processor of claim 9 wherein the bus interface unit detects the processor state information according to the identified mode using internal address and data buses.

11. The processor of claim 10 wherein the plurality of external pins for communicating data from the processor includes external address pins and external data pins and wherein the bus interface unit outputs processor state information according to the identified mode onto the external address pins and the external data pins in response to detecting an idle bus cycle.

12. The processor of claim 8 wherein the plurality of external pins for communicating data from the processor includes an address control pin for outputting an address control signal that indicates the presence of a valid address and bus cycle definition on the plurality of external pins.

13. The processor of claim 12 wherein the processor deactivates the address control signal while outputting processor state information according to the identified mode onto the plurality of external pins.

14. A computer system, comprising:

a plurality of system components;

a system bus connected to the plurality of system components for transferring data to and from the system components;

a system bus controller for controlling transfer of the data on said system bus; and a processor, comprising:

a plurality of external pins connected to the system bus;

a visibility register for identifying at least one of a plurality of modes of outputting processor state information;

a bus interface unit for controlling the communication of data on the external pins to the system bus and for detecting an idle bus cycle of the system bus; and wherein the bus interface unit outputs processor state information onto the plurality of external pins according to the identified mode in response to detecting the idle bus cycle.

15. The computer system of claim 14 wherein the visibility register for selecting at least one of a plurality of modes for outputting data comprises a visibility register for selecting either a first mode which identifies prefetch instruction data and address data or for selecting a second mode which identifies data contained in internal registers.

16. The computer system of claim 14 wherein the plurality of external pins connected to the system bus includes external address pins and external data pins and wherein the bus interface unit outputs processor state information according to the identified mode onto the external address pins and the external data pins in response to detecting an idle bus cycle.

17. The computer system of claim 14 wherein the plurality of external pins connected to the system bus includes an address control pin for outputting an address control signal that indicates the presence of a valid address and bus cycle definition on the plurality of external pins.

18. The computer system of claim 17 wherein the processor deactivates the address control signal while outputting processor state information according to the identified mode onto the plurality of external pins.

* * * * *